UNITED STATES PATENT OFFICE.

ERICH FRIEDEMANN, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

PROCESS OF PRODUCING DYED-ACIDYLIZED-CELLULOSE COMPOUNDS.

994,738.  Specification of Letters Patent.  Patented June 13, 1911.

No Drawing.    Application filed March 10, 1911.  Serial No. 613,560.

*To all whom it may concern:*

Be it known that I, ERICH FRIEDEMANN, doctor of philosophy, chemist, citizen of the German Empire, residing at Leverkusen, near Cologne, Germany, have invented new and useful Improvements in Dyed-Acidylized-Cellulose Compounds and Processes of Making Same, of which the following is a specification.

Cellulose esters, such as for instance acetyl cellulose can only be dyed with difficulty and the dyeing of these bodies according to the hitherto known methods suffers from the disadvantage that the strength of the cellulose esters is considerably reduced. I have now found that dyed acidyl celluloses of a great technical value can be obtained in a very simple manner by producing the acidyl derivatives from dyed cellulose compounds, such as cotton, wood-cellulose, oxy-cellulose, hydrocellulose, etc. with acidylizing agents. For the dyeing of the cellulose, coloring matters have to be used which are stable against the acid agents employed in the acidylizing process, e. g. algol, indanthrene, or sulfur colors, etc. Algol red, helindon scarlet, rosanthrene, diazo brilliant scarlet can for instance be used for red, algol- and indanthrene blue for blue, katigen brilliant green for green, katigen violet or diazo indigo blue for violet, katigen black or immedial black for black, etc. It is surprising that the shades are not deteriorated by the subsequent process of acidylation, but are even purer after acidylation than before. The possibility of using the above mentioned dyestuffs is of great importance as the shades produced with them are very fast to light. Dyed films and other articles of acetyl cellulose possessing an excellent fastness to light can thus be produced. The acidylizing process is carried out according to the usual methods.

In order to illustrate the new process more fully the following examples are given, the parts being by weight:—

Example 1.—200 parts of cotton dyed with 4 per cent. of rosanthrene A and developed on the fiber with the usual developers, such as beta-naphthol, meta-phenylenediamin, etc., are acetylized according to the process of the British Letters Patent No. 21628/01 with 800 parts of acetic acid anhydrid, 800 parts of glacial acetic acid and 20 parts of sulfuric acid. The dark red solution is then precipitated with water, the acetyl cellulose is washed, dried and dissolved in chloroform. The solution leaves, after evaporation of the solvent, a clear light red film.

Example 2.—200 parts of cotton are dyed with 10 per cent. katigen brilliant green and are acetylized as is described in the above mentioned Example 1. The solution leaves, after evaporation of the solvent, a clear dark green film.

Example 3.—200 parts of cotton are dyed with 10 per cent. helindon scarlet S and then acetylized and worked up as described in Examples 1 and 2. A brilliant vermilion red product is obtained.

Example 4.—According to the process of the German Letters Patent No. 184201 (see Example 3), 100 parts of cotton, dyed for instance with 20 per cent. algol red B are acetylized with 400 parts of acetic acid anhydrid and 1500 parts of benzene. A red product is obtained which dissolves in chloroform.

Example 5.—200 parts of cotton, dyed with indanthrene RS, are formylized with 100 parts of formic acid and 3 to 10 parts of sulfuric acid of 66° Bé. according to the German Letters Patent No. 189836. A dark blue solution is thus obtained, from which the dark blue formyl cellulose can be precipitated and washed in the usual manner with water, without detriment to the color. It is soluble in the usual solvents and blue films etc. can be produced from the solutions. The process is carried out in an analogous manner by using other cellulose compounds or other suitable dyestuffs.

I claim:—

1. In the art of producing dyed acidylized cellulose compounds, the process consisting in treating with an acidylizing agent a dyed cellulose compound, substantially as described.

2. In the art of producing dyed acetylized cellulose compounds, the process consisting in treating with an acetylizing agent a dyed cellulose compound, substantially as described.

3. In the art of producing dyed acidylized cellulose compounds, the process consisting in treating with an acidylizing agent dyed cotton, substantially as described.

4. In the art of producing dyed acetylized cellulose compounds, the process consisting in treating with an acetylizing agent dyed cotton, substantially as described.

In testimony whereof I have hereunto set my hand in the presence of two subscribing witnesses.

ERICH FRIEDEMANN. [L. S.]

Witnesses:
CHAS. J. WRIGHT,
ALFRED HENKEL.